March 7, 1967 J. E. A. GRAAE 3,307,665
POWDER COUPLING HAVING PRESSURE ADJUSTABLE MEANS
Filed April 22, 1965
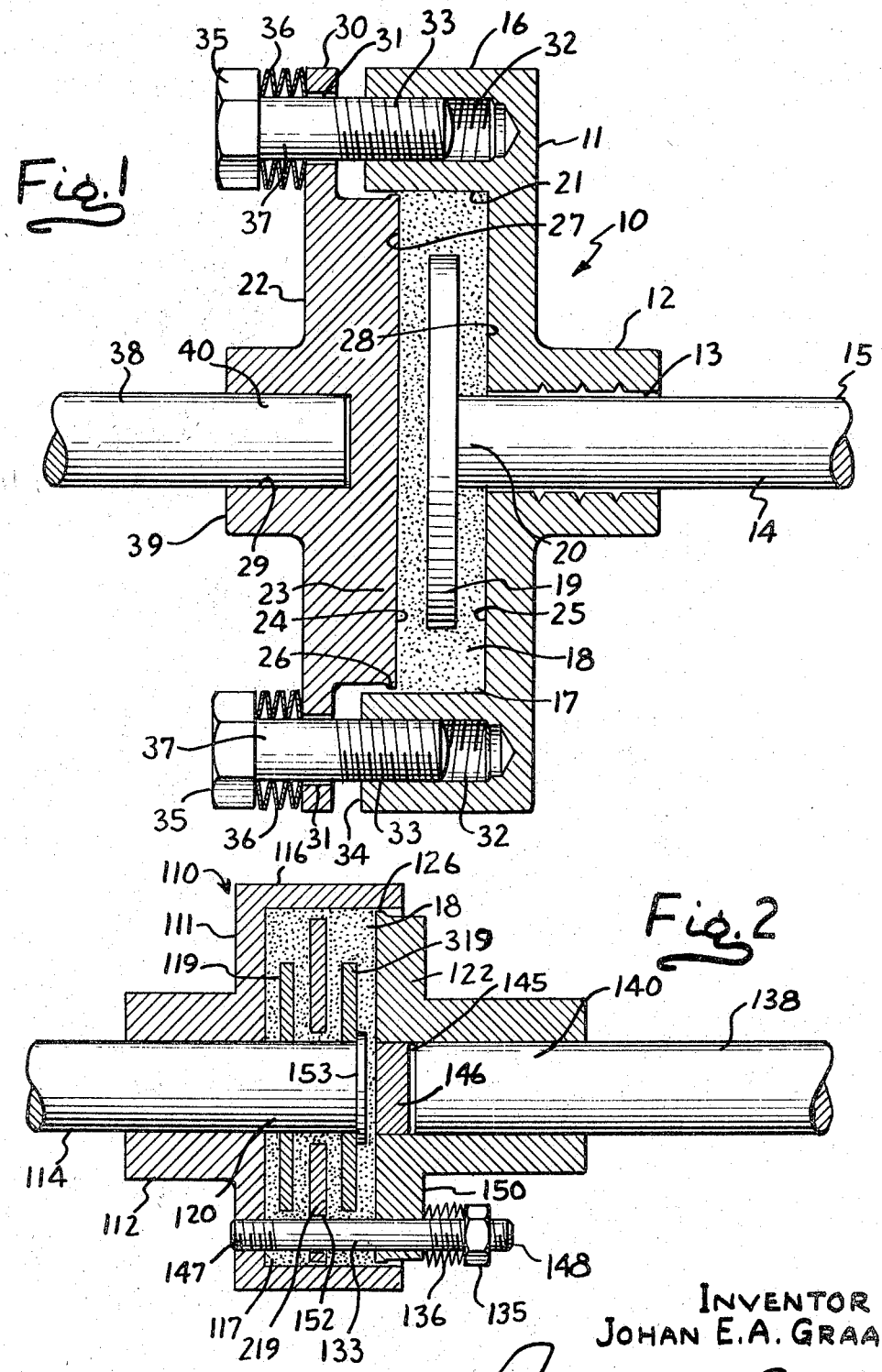
INVENTOR
JOHAN E.A. GRAAE
ATTYS.

United States Patent Office 3,307,665
Patented Mar. 7, 1967

3,307,665
POWDER COUPLING HAVING PRESSURE
ADJUSTABLE MEANS
Johan E. A. Graae, 315 N. Myrtle Drive,
Elmhurst, Ill. 60126
Filed Apr. 22, 1965, Ser. No. 450,070
7 Claims. (Cl. 192—58)

This invention relates to torque transfer mechanisms of the class referred to as powder couplings and the like.

A powder coupling conventionally comprises a housing which defines an enclosed space, a mass of powder or particulate character confined in the housing space, and a rotor, generally, in the form of a disc, and having parts engaging in the mass and operably connected to a driven member such as a shaft. By providing frictional forces greater than the torque of the driven member between the powder or particulate matter and its housing and the powder or particulate matter and the rotor, the powder will serve as a solid link or clutch to rotate the housing. When the input torque reaches a magnitude greater than the gripping force between the rotor and the powder, the clutch will slip.

Heretofore, employment of powder couplings has been limited because the only known or taught manner for generating frictional force adequate for coupling operation has been by auto centrifugal means or by using magnetic powder in an electromagnetic field. That is to say, each prior coupling requires that its rotors generate a centrifugal force of a magnitude sufficient to compact the powder against its housing with a grip greater than the torque of the rotor, whereby to effectively transmit torque therefrom to the housing. Hence, high input speed is required before a conventional powder coupling can operate, as a low speed fails to produce required gripping force, and accordingly, prior devices are incapable of low speed output.

Furthermore, inherent in the nature of conventional disc type clutches the requirement for a substantially higher breakaway torque to disengage a housing from its rotor than that needed to continue to keep the coupling disengaged or in a clutch-slipped state. Accordingly, inconvenient lags result in the operation of conventional devices, creating problems for which adjustment must be made depending upon uses of such conventional couplings.

It is an object of the instant invention to provide a new and novel powder coupling construction.

It is a further object of the instant invention to provide a powder coupling construction in which the size of the chamber in which the powder is confined is adjustable to vary the pressure on the powder.

Another object of the instant invention is to provide a powder coupling construction having a housing defining a space in which the powder is confined and a driven rotor engaged in the powder and adapted to drive the housing at selected torques ranging between zero and any value upwardly therefrom.

A yet further object of the instant invention is the provision of a powder coupling construction having a rotor and a housing, said rotor and housing being relatively rotatable, with a driving torque transmittable from one to the other through the medium of a powder the operational gripping force of which can be independent of the speed of rotation of the rotor or the housing.

A still further object of the instant invention is the provision of a coupling of the class described in which the pressure of the powder on the gripped or clutched surfaces is controlled by a selectively adjustable piston-like member, to thereby selectively control the torque at which the clutching surfaces of the coupling will slip and the coupling accordingly become uncoupled.

An additional object of the instant invention is the provision in a powder coupling of a mass of powder or particulate material which serves as a torque transmission link and also as a lubricant to minimize wear of relatively rotating parts.

Yet another object of the instant invention is the provision of a powder coupling construction for which the clutch breakaway torque is substantially the same as the torque required to keep the driven part slipping or uncoupled; that is to say, the magnitude of breakaway torque is not substantially beyond that required to keep the coupling uncoupled or disengaged.

Still a further object of the instant invention is the provision of a powder coupling comprising a housing defining a chamber in which there is confined under adjustable pressure a mass of powder and having a driven shaft carrying a rotor engaged in said powder, said rotor being self-adjustable axially of said shaft to insure equalization of powder pressure on all rotor surfaces.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a sectional view through a powder coupling comprising one embodiment of the present invention.

FIG. 2 is a sectional view through another coupling comprising a modified embodiment of the present invention.

Referring now more particularly to FIG. 1, there is shown a coupling casing or housing generally designated by numeral 10. Housing 10 comprises what may be characterized as a side member 11 which has a core or hub extension 12 which is centrally disposed relative to and projected outwardly from said side member. The hub 12 has a bore or passage 13 in which there is mounted a drive or input shaft 14 which has an outer end portion which may be operably connected to any suitable driving source (not shown).

The housing member 11 has an integral peripheral annular flange 16 which extends normally from side member 11 and with the inner surface 25 of side 11 defines a recess, well, hollow or cavity 17. A substantially dry mass of a powder, powder-like, or particulate material 18 is confined in a portion of recess, well or cavity 17 against surface 25 in a manner which will be apparent more fully presently. A rotor 19, which in the instant embodiment is in the form of a disc, is rigidly secured on the inner end portion 20 of the shaft 14 which projects through wall 11 into that part of the recess, well or cavity 17 in which mass 18 is confined.

The foregoing construction disposes end portion 20 in the recess, well or cavity centrally of the inner surface 21 of flange 16. Furthermore, the rotor 19 is mounted concentric with the shaft 14, whereby the periphery of said rotor is disposed centrally with respect to the inner surface 21. In addition to being journalled for rotation in the hub 12, the shaft 14 is mounted by means, known to those skilled in the art, which will permit sliding movement of the shaft 14 axially thereof for adjustment of the rotor 19 for a reason and by a mechanism which will be presently apparent.

An adjustable cover, plate or piston 22 comprises an adjustable wall of the housing 10. The cover, plate or piston 22 has an integral inner portion 23 which is disposed within the cavity, recess or well 17, said inner portion 23 having an inner face 24 which is spaced from the inner face 25 axially of shaft 14 to thereby define an enclosure, said enclosure being the restricted part of the recess, well or cavity 17, in which the powder 18 is confined. To preclude loss of powder through any opening between the cover, plate or piston 22 and the peripheral flange 16, the inner portion 23 has an annular peripheral flange or lip 26 projected radially outwardly into sealing association with surface 25.

The cover, plate or piston 22 is mounted for movement axially of the shaft 14, and said cover, plate or piston has its inner surface 24 bearing against what, for the purpose of clarity of description, may be referred to as the output face 27 of the powdery mass 18. The other faces 28 of the powdery mass bear against the inner surfaces 21 and 25 of the member 11.

The cover, plate or piston 22 has therefrom a radially extending peripheral flange 30. Flange 30 has a plurality of therethrough extending annularly spaced apertures 31 which are aligned with internally threaded holes 32 in the flange 16, whereby a plurality of bolts 33 are accommodated to connect together cover, plate or piston 22 and the side housing member 11. The disposition of the flange 30 with respect to the piston surface 27 is such that normally the flange 30 is spaced apart from the facing surface 34 of the flange 16. To that end, piston inner portion 23 serves as a spacer. The bolts 33 which extend through the apertures 31 are adjustably threaded in the holes 32, respectively, thereby to adjust the position of the cover, plate or piston 22, as will become more clearly apparent from that which next follows.

The heads 35 of bolts 33 are spaced from the flange 30 to provide for the mounting of compression or disc-type springs 36 about the outwardly projected parts 37 of said bolts, respectively, between the bolt heads 35 and the flange 30. Thereby, pressure upon the cover, plate or piston 22 can be adjusted by turning the bolts to move said member 22 inwardly and outwardly relative to mass 18, the pressure increasing as the bolts are tightened and the springs compressed, the pressure decreasing as the bolts are loosened and the springs accordingly decompressed.

Attention is invited to the representation that the particular means shown herein for control of the pressure on the cover, plate or piston 22 is illustrative only, and that within the scope of the invention various means may be employed for adjusting the load or landing the cover, plate or piston 22, which may include hydraulic, pneumatic, electrical, or other mechanical means which will be evident to those skilled in the art.

By varying the compression force on the cover, plate or piston 22, the pressure on or compacting force of the mass 18 is varied. Accordingly, the pressure or frictional force of the mass 18 on the rotor 19 as well as on the plate 22 is varied. Thereby, with reference to a given powder mass 18, the input torque required to cause the rotor 19 to slip within the mass 18 will vary in direct proportion to the pressure of the mass 18 on the rotor 19.

The nature of the present invention is such that as the pressure on mass 18 varies, the position of the rotor 19 will automatically adjust axially of the shaft 14. The self-adjustment of the rotor 19 will equalize pressure of the powdery mass on opposite surfaces of said rotor.

In the instant embodiment of the invention, the cover, plate or piston 22 serves as an output member, and to such end it is rigidly secured to an output shaft 38 which herein is shown co-axially aligned with shaft 14. The securance may be by means of an integral hub, boss or extension 39 which is disposed centrally of and projected outwardly from said cover, plate or piston 22. The hub 39 has an outwardly opening pocket 29 in which an inner end portion 40 of the shaft 38 is secured by any suitable or conventional mechanism which will be apparent to those skilled in the art.

An understanding of the manner in which the device operates is facilitated by an appreciation that the mass 18 of powder or particulate matter is adapted to serve as a solid linkage between the rotor 19 and the cover, plate or piston 22. When rotation thereof occurs, therewith the casing side member 11 will also rotate by reason of being tied by bolts 33. The mass 18 serves as a link to rotate member 22 when the friction or gripping forces between the rotor 19 and the mass 18 and the piston surface 24 and powder surface 27 are of magnitudes greater than the magnitude of the torque of the rotating rotor. Under such conditions, when the rotor 19 is rotated, it is tied to the mass 18 by friction to cause the mass 18 to rotate, and the mass 18 being tied to the cover, plate or piston 22 by friction will cause rotation thereof and of side member 11.

Once the torque of the rotor is of a magnitude greater than the force of the pressure or friction, the clutching force, if you will, between the powdery mass 18 and the rotor, the rotor will slip in the mass 18. Verbally characterized in another fashion, it can be said that the breakaway energy level of the clutch is reached when the magnitude of the torque overcomes the frictional clutching force between the mass 18 and the rotor 19. From the foregoing it is apparent that the friction forces developed within the coupling are dependent upon the nature of the materials employed (which will determine their coefficients of friction) as well as the pressure which is controlled through the cover, plate or piston 22.

Unlike prior devices which are inoperative for low speeds because of the requirement to build centrifugally generated coupling forces dependent upon high input speeds, the instant invention can be effectively coupled at input speeds which range upwardly from zero. Furthermore, the slipping or breakaway torque level of the rotor can be controlled by the adjustable pressure means 22, to produce exceedingly high output torques.

In the modified form of the invention illustrated in FIG. 2, a coupling housing construction generally designated by numeral 110 comprises a housing side member 111. Side member 111 forms a wall for a chamber 117 in which there are disposed a plurality of discs 119, 219 and 319. Said discs 119, 219 and 319 are spaced from each other axially on the extension 120 of an input shaft 114 which is projected into chamber 117 through a centrally disposed housing hub 112 in which said shaft 114 is journalled. A cover, plate or piston 122 is tied to the side member 111 by means including a threaded rod or connector 133, and, with said side member 111, defines the chamber 117. The mass 18 of powder or particulate material which fills the available space in chamber 117 is confined therein by the cover, plate or piston 122 and the member 111, as illustrated in FIG. 2.

In the interest of simplicity of manufacture, the cover, plate or piston 122 may have therethrough extending a centrally disposed bore 145 in which there is rigidly secured the mounting end portion 140 of an output shaft 138 which may be co-axially aligned with the input shaft 114. To preclude the leakage of the powder into the bore 145, a plug 146 may be employed to seal the inner end portion of the bore 145. To preclude circumferential leakage of the powder about member 122, its integral radially extending peripheral lip 126 is sealed within flange 116 of side member 111.

As illustrated, the tie or connector 133 extends through the chamber 117, and has a threaded end portion 147 which threadingly engages in an aperture thereof in the side member 111. An opposite portion 148 of said tie 133 is projected through the cover, plate or piston 122, said end portion 148 having thereon mounted an adjustable nut 135. The nut 135 corresponds to and functions as the head 35 of the bolt 33. That is to say, the nut 135 is spaced from the outer surface 150 of the cover, plate or piston 122, and a disc-type or compression spring 136 is disposed about the tie 133 between said cover, plate or piston 122 and the nut 135, whereby pressure may be adjusted on the piston 122 to adjust the compacting or frictional force of the mass 18.

Unlike the shaft 14 which is axially adjustable, the shaft 114 need not be because the rotor of the embodiment of FIG. 2 is adjustable by means now to be described. The discs 119 and 319 are splined on shaft extension 120 for rotation therewith. However, said discs 119 and 319 are slidable axially of shaft 114 independently thereof, thereby being shiftable to equalize pressure on opposite surfaces of said discs 119 and 319. Furthermore, the disc 219 which is disposed medially of the discs 119 and 319 is mounted for rotation with the housing 111 rather than with the shaft 114. The latter is achieved by mounting the disc 219 about extension 120 spaced concentrically therefrom and providing an aperture 152 in a peripheral part of said disc 219, said aperture 152 being passaged by the tie 133. Thereby, while the disc 219 is adjustable axially of said pin 133 and shaft 114 to equalize pressure, it is rotatable only with said housing 111.

In constructions of powder couplings in accordance with the present invention and employing a plurality of discs, it has been found preferable to connect every other or alternate discs to the input shaft in such a manner that the discs 119 and 319 are connected to shaft 114, and to connect the interposing discs, that is, those disposed between discs connected to the shaft, to the housing 110, for example, in the manner that the disc 219 is connected. When the coupling comprises a plurality of discs shiftable axially of the input shaft, as in FIG. 2, a retainer 153 should be mounted on the innermost end of the shaft extension 120 to preclude overshifting of the disc 319 and retain the same on the shaft portion 120. By thus providing a limitation for axial adjustment of the disc 319, axial movement of the other discs 119 and 219 will be automatically limited, inasmuch as the inherent nature of the construction tends to cause automatic shifting of the discs to equalize pressure on opposite surfaces thereof. Attention is invited to the further fact that in constructions employing a plurality of discs, a powdery layer preferably is maintained between adjacent discs.

Molybdenum disulphide may be satisfactorily employed as the powder in the instant powder coupling construction. It is a well known dry lubricant, and has the advantage of retaining lubricity in a dry, inert atmosphere, and, since it contains no organic compounds, it is highly resistant to radiation damage. It is stable at elevated temperatures, and can be used in an environment heated up to 750° F. Its coefficient of friction is adequate for transmission of suitable torques, and although the powder, as available commercially, is exceedingly fine, the molybdenum disulphide has a tendency to cake or clog. This latter characteristic minimizes leakage from the housing through the spaces between the housing and the various movable parts, such as the piston and the input shaft.

Other dry powders which have required characteristics by which they are adapted for use in the instant invention include tungsten disulphide, graphite, calcium fluoride, barium fluoride and metal-free phthalocyanine. Operating conditions will indicate the characteristics which will cause preference of one powder composition over another. Graphite, for instance, becomes abrasive in a dry atmosphere, and would cause wear of the friction surfaces. Accordingly, under certain conditions, therefore, graphite would be contra-indicated.

Couplings embodying the instant invention have wide adaptability. For example, they may be used in clutch mechanisms and in brake mechanisms. Other uses will be apparent to those skilled in the art.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A powder coupling and the like comprising
   relatively rotatable co-axial driving and driven elements;
   one of said elements including a casing having therein a hollow;
   the other of said elements including a rotor disposed within the hollow in said casing;
   a powder-like mass entirely filling the hollow about said rotor, said rotor is self adjustable in said powder-like mass to equalize pressure thereof about said rotor, and
   pressure means for releasably compressing the powder-like mass.

2. The device defined in claim 1 further characterized by
   means providing an axis of rotation for said rotor,
   said rotor mounted for movement axially of said axis of rotation and movable in response to changes in pressure in the powder-like mass to equalize pressure thereof about said rotor.

3. The device defined in claim 1 in which the rotor comprises
   a shaft journalled in said housing, and
   radially extending means disposed about said shaft and self-adjustable axially thereof to equalize pressure about said radial means.

4. The device defined in claim 3 in which the radially extending means comprises a plurality of members spaced axially of said shaft and concentric therewith, alternate of said members connected on said shaft and rotatable therewith, the remainder of said members connected to said housing and rotatable therewith.

5. The device defined in claim 1 in which the pressure means comprises
   a section of said housing adjustably secured to the remainder thereof and having parts disposed against said powder-like mass frictionally in engagement therewith, and
   an adjustable mechanism for moving said section inwardly and outwardly of the hollow and holding said section in adjusted position against the powder-like mass,
   to thereby vary the pressure thereon and on said rotor.

6. In a powder coupling and the like having a housing defining a chamber therein, a powdery mass disposed in said chamber, a shaft journalled in said housing, a rotor mounted on said shaft and disposed in said chamber, a rotatable element secured to said housing and co-axially aligned with said rotor, said rotor and element rotatable relative to and together with each other, the improvement characterized by
   said powdery mass entirely filling said chamber about said rotor;
   said rotor self-adjustable axially of said shaft to equalize pressure of said powdery mass on said rotor;
   said housing having an adjustable part defining said chamber and engaging said powdery mass for varying the size of said chamber and the pressure on said powdery mass, and
   means for moving and holding said adjustable part to maintain pressure on said rotor at a selected level.

7. In a powder coupling and the like having a housing defining a chamber therein, a powdery mass disposed in said chamber, a shaft journalled in said housing, a rotor mounted on said shaft, an element secured to said housing and coaxially aligned with said rotor, said rotor and element movable relative to each other, the improvement characterized by said powdery mass entirely filling said chamber about said rotor; said housing having an adjustable part defining said chamber and engaging said powdery mass for varying the size of said chamber and the pressure on said powdery mass; said rotor comprising a plurality of discs self-adjustable axially of said shaft to equalize pressure of said powdery mass on each of said discs, alternate of said discs connected on said shaft, tie means connecting the other of said discs to said housing, and means for releasably securing said adjustable part in selected positions of adjustment.

References Cited by the Examiner

UNITED STATES PATENTS

| | | | |
|---|---|---|---|
| 1,238,098 | 8/1917 | Brinton | 192—58 |
| 1,862,802 | 6/1932 | Pope | 192—58 |
| 2,576,156 | 11/1951 | Trofimov | 192—58 |
| 2,714,946 | 8/1955 | Tenot et al. | 192—58 |
| 2,924,122 | 2/1960 | Foster | 192—58 X |
| 2,985,272 | 5/1961 | Sivacek | 192—58 |
| 3,180,571 | 4/1965 | Caroli et al. | 192—58 X |

FOREIGN PATENTS

| | | |
|---|---|---|
| 1,249,263 | 11/1960 | France. |
| 178,653 | 11/1906 | Germany. |

DAVID J. WILLIAMOWSKY, *Primary Examiner.*

A. T. McKEON, *Assistant Examiner.*